(12) United States Patent
Yasuda

(10) Patent No.: US 6,964,128 B2
(45) Date of Patent: Nov. 15, 2005

(54) FLOWERPOT EQUIPPED WITH LIGHT-SHADE

(76) Inventor: Kouji Yasuda, 2-2, Miyamatsu-cho, Hiratsuka-shi, Kanagawa-ken (JP)

( * ) Notice: Subject to any disclaimer, the term of this patent is extended or adjusted under 35 U.S.C. 154(b) by 135 days.

(21) Appl. No.: 10/458,441

(22) Filed: Jun. 10, 2003

(65) Prior Publication Data

US 2004/0003538 A1 Jan. 8, 2004

(30) Foreign Application Priority Data

Jul. 8, 2002 (JP) .............................. 2002-198549

(51) Int. Cl.⁷ ........................ A01G 27/06; A01G 9/02
(52) U.S. Cl. ...................... 47/65.7; 47/66.7; 47/64; 47/59 R; 47/20.1; 47/DIG. 6; 47/72
(58) Field of Search .................... 47/65.7, 64, 63, 47/66.7, 20.1, 29.1, 29.3, 30, DIG. 6, 72; A01G 27/06

(56) References Cited

U.S. PATENT DOCUMENTS

| 1,868,853 | A | * | 7/1932 | Sievers | 47/72 |
| 2,035,384 | A | * | 3/1936 | Hincliff | 66/170 |
| 4,051,625 | A | * | 10/1977 | Sawyer | 47/14 |
| 4,908,986 | A | * | 3/1990 | Rowland et al. | 47/80 |
| 5,279,070 | A | * | 1/1994 | Shreckhise et al. | 47/39 |
| 5,706,605 | A | * | 1/1998 | Alcazar et al. | 47/65.7 |
| 6,108,974 | A | * | 8/2000 | Herzog-Mesrobian et al. | 47/72 |
| 6,598,341 | B2 | * | 7/2003 | Weder | 47/72 |
| 2003/0150159 | A1 | * | 8/2003 | Kennedy | 47/72 |
| 2003/0188480 | A1 | * | 10/2003 | Whitcomb | 47/72 |

FOREIGN PATENT DOCUMENTS

| FR | 2603159 | * | 3/1988 | A47G 7/08 |
| FR | 2619698 | * | 3/1989 | A01G 5/04 |
| JP | 7-132027 | | 5/1995 | |
| JP | 07-132027 | * | 5/1995 | A01G 27/06 |
| JP | 2002-58349 | | 2/2002 | |
| JP | 2003061475 | * | 3/2003 | A01G 9/02 |

OTHER PUBLICATIONS

Japanese Patent English Translation JP 07-132027 to Koji Yasuda, filed Nov. 12, 1965, 6 pp.*

* cited by examiner

Primary Examiner—Peter M. Poon
Assistant Examiner—Andrea M. Valenti
(74) Attorney, Agent, or Firm—Carella, Byrne, Bain et al; Elliot Olstein; William Squire

(57) ABSTRACT

Growth of a plant can be properly controlled, when a flower pot made of a transparent plastic and detachable light shades to the flower pot for controlling light are employed, as growth and increase of roots of the plant being observed through the transparent flower pot.

8 Claims, 4 Drawing Sheets

FLOWERPOT EQUIPPED WITH LIGHT-SHADE

BACKGROUND OF THE INVENTION

1. Field of the Invention

The present invention relates to a transparent flower pot equipped with light-shades capable of supplying enough oxygen and water to roots of plants such as orchids, which are prone to a root rot, capable of enhancing growth of the roots and capable of observing the growth of the roots from the outside.

2. Brief Description of the Related Art

When decorative plants such as orchids are raised, scrupulous cares are required so as to supply proper amounts of water and oxygen to their roots constantly.

For that purpose, the applicant proposed a flower pot capable of supplying enough oxygen and water to roots of plants and capable of enhancing growth of the roots as disclosed in Japanese laid open patent No. 7-132027.

Arrangements of the proposed flower pot are shown in FIGS. 5 to 7. FIG. 5 is a plan view of the proposed flower pot, FIG. 6 is a cross-sectional view cut along a C—C plane in FIG. 5 and FIG. 7 is a cross-sectional view cut along a D—D plane in FIG. 5. A main part 13 of the flower pot is fitted to a dish 12 having water reservoir 11, which are dented partially so as to form air passages 18 between the water reservoir 11 and the bottom of the main part 13 of the flower pot. A perforated container 14 having a plurality of circular openings 16 and elongated oval openings 17, is placed in the dish 12 so as to be fitted to the bottom of the main part 13 of the flower pot. The perforated container 14 has a U-shaped cross section in its bottom portion, which is fitted in the water reservoir 11. Water absorbers 15 are accommodated in the perforated container 14. The water absorbers 15 consist of selected pieces of broken unglazed pottery in accordance with shapes of the dish 12 and the main part 13 of the flower pot.

Orchid roots are wrapped with sphagnum and inserted in the pain part 13. After the water absorbers 15 are accommodated in the perforated container 14, water is supplied directly to the main part 13 of the flower pot or to the water reservoir 11.

The sphagnum in the main part 13 of the flower pot holds a proper amount of water that does not cause the root rot. Excessive water in the sphagnum drips into the reservoir 11 via the circular openings 16 of the perforated container 14 and the water absorbers 15. When water in the main part 13 of the flower pot is decreased due to absorption by the orchid or evaporation, water is supplied from the reservoir 11 via the water absorbers 15.

Oxygen required by the roots is supplied from air flowing from the circular openings 16 and the elongated oval openings 17 of the perforated container 14 via the air passages 18. Roots, extending to the water reservoir 11 via the circular openings 16 and the elongated oval openings 17 of the perforated container 14, absorb oxygen directly from the atmosphere so that they grow and increase.

Since the conventional flower pot is constituted in the above-mentioned manner, enough water and oxygen can be supplied to orchid roots, which are prone to the root rot, so that the flower pot enhances growth and increase of the roots.

However, since growing and/or increasing states of the orchid roots cannot be observed in the conventional flower pot, growing procedures of the roots can not be controlled properly.

SUMMARY OF THE INVENTION

The present invention is carried out in order to solve above-mentioned problem and to provide a transparent flower pot equipped with light shades capable of supplying enough oxygen and water to roots of plants, capable of enhancing growth and increase of the roots and capable of controlling growing procedures as observing the roots from the outside.

The transparent flower pot by the present invention comprises: a dish having a water reservoir in its center; a cylindrical pot, the bottom of which is fitted uprightly to the periphery of the water reservoir; a bottom plate for the pot having a hat-shaped cross-section, comprising a top portion and a flange, on which a plurality of openings are formed, wherein the bottom plate is arranged such that the top portion is fitted in the water reservoir and the flange is fitted to the bottom of the pot and is arranged over the dish; water absorbers accommodated in the top portion of the bottom plate; and openings formed between the pot and the dish so as to form air passages from the water reservoir to the outside of the transparent flower pot, wherein: at least the pot and the bottom plate are made of a transparent plastic, and detachable light shades for covering exterior surfaces of the dish and the pot are fitted to the dish and the pot.

The water absorbers of the transparent flower pot by the present invention comprise pieces of broken unglazed pottery.

The flower pot by the present invention is made of a transparent material and is equipped with the detachable light shades for covering exterior surfaces of the flower pot, which is a different feature from that of the conventional flower pot.

DETAILED DESCRIPTION OF THE PREFERRED EMBODIMENTS

Figure 1:
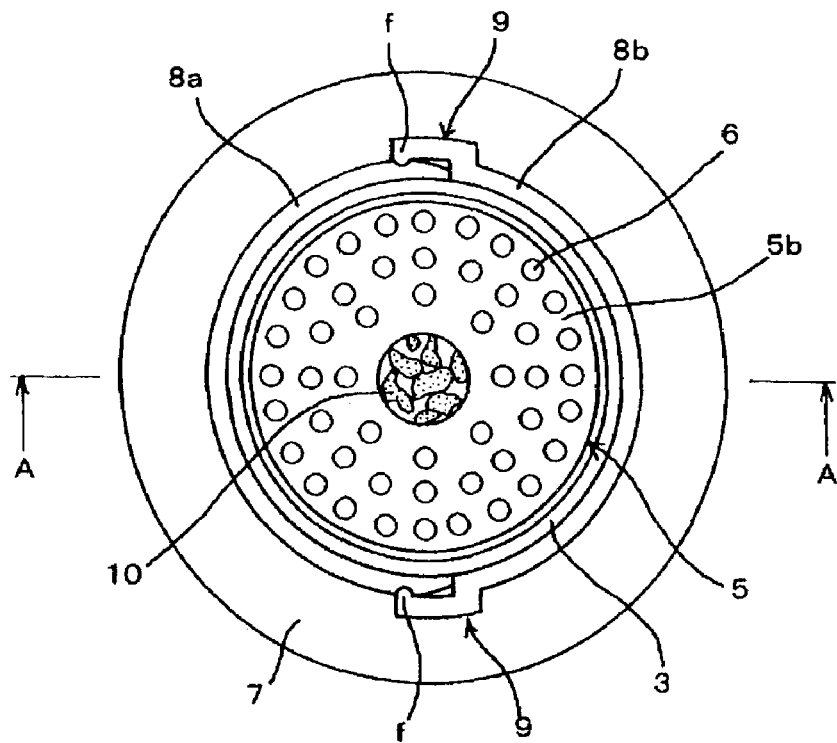
FIG. 1 is a plan view showing the flower pot equipped with light shades by an embodiment of the present invention.

Hereinafter the embodiment by the present invention is explained as referring to the drawings.

Figure 2:
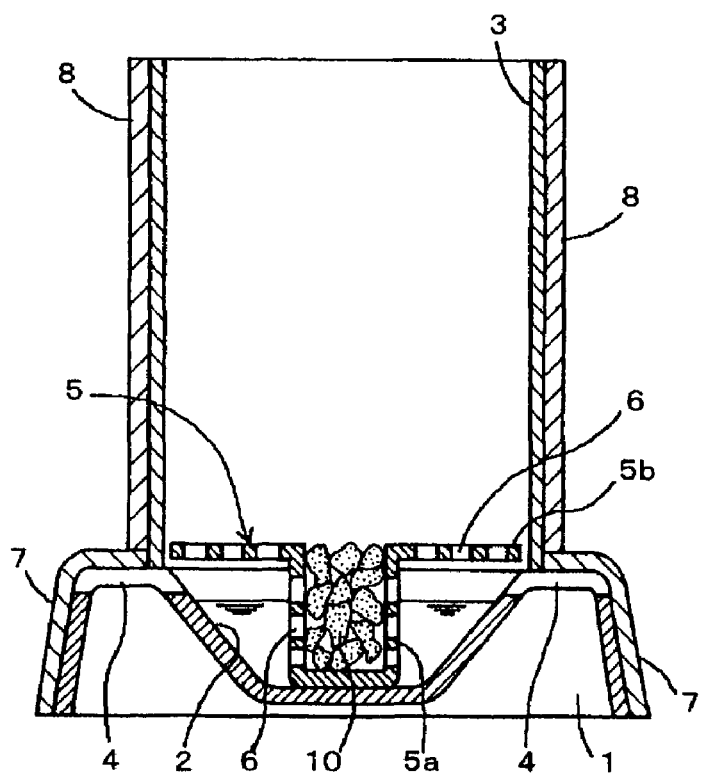
FIG. 2 is a cross-sectional view of the flower pot cut along a plane A—A in FIG. 1.
Figure 3:
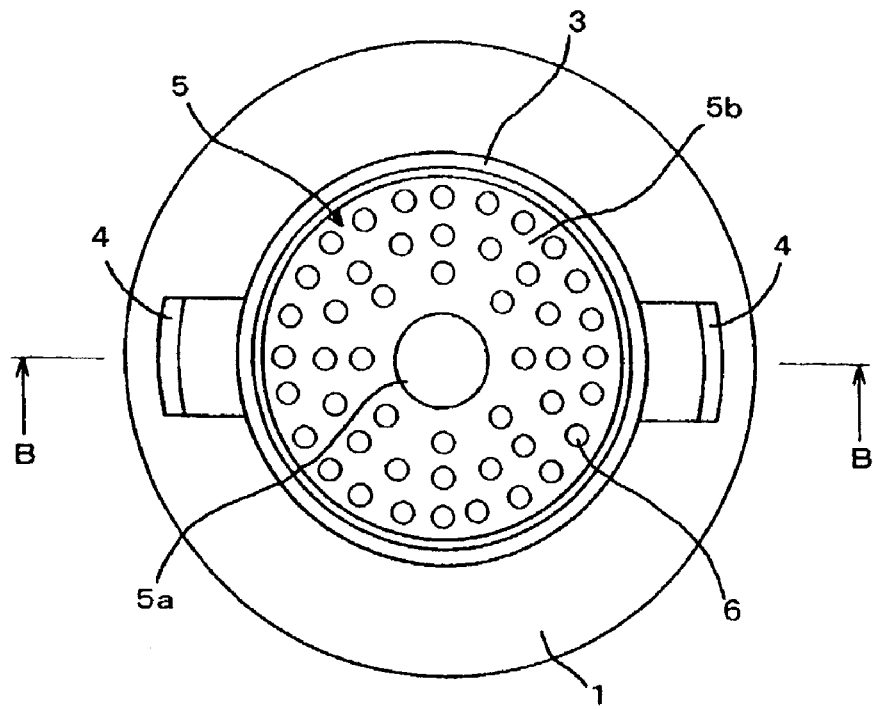
FIG. 3 is a plan view showing a transparent flower pot where water absorbers are arranged but light shades are not fitted yet.
Figure 4:
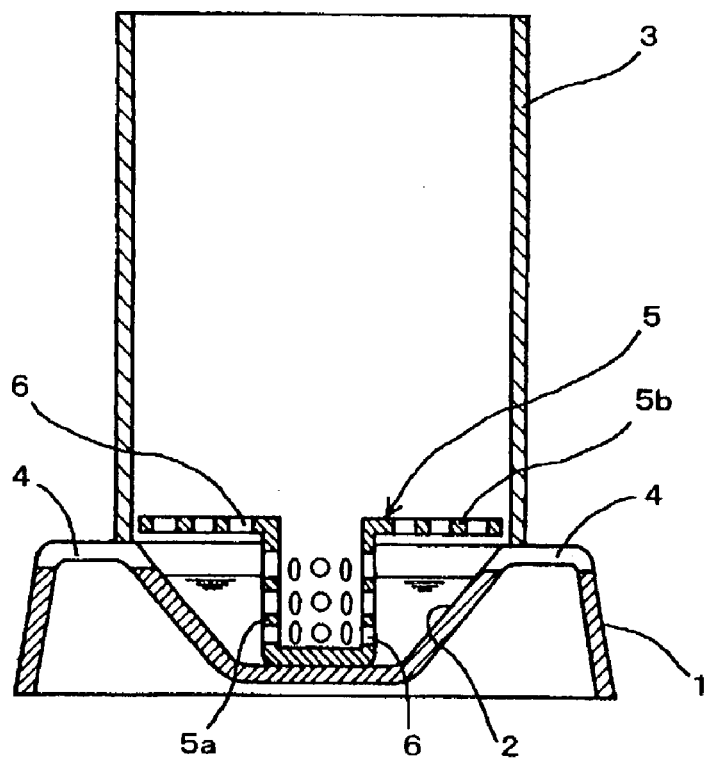
FIG. 4 is a cross-sectional view of the flower pot cut along a plane B—B in FIG. 3.
Figure 5:
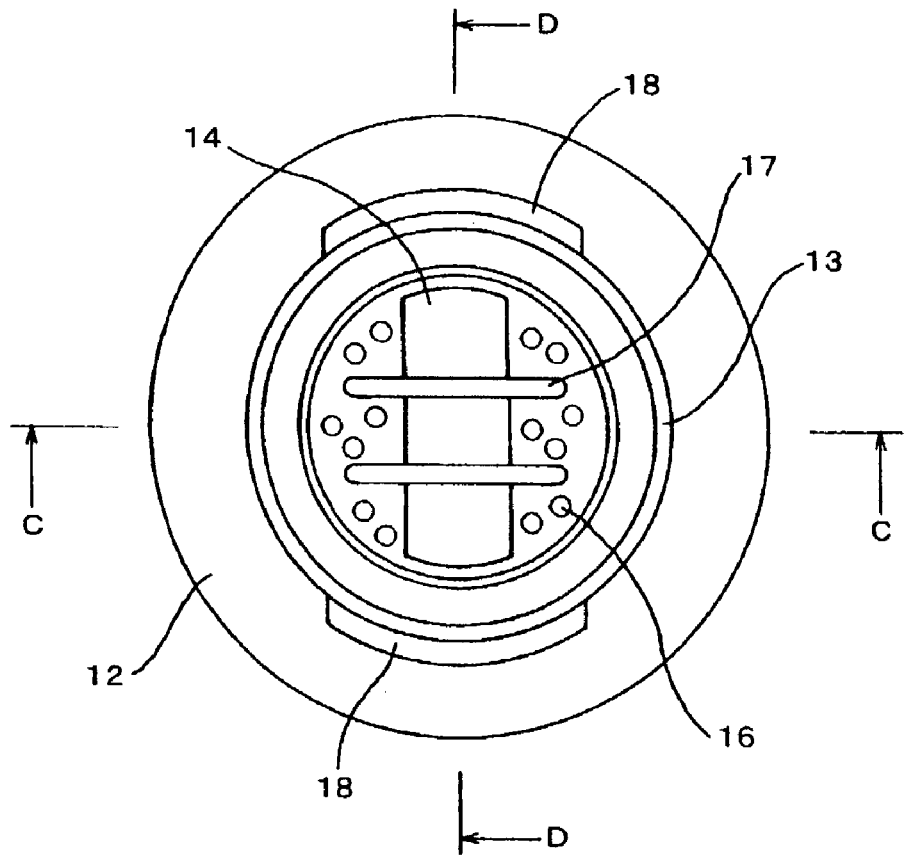
FIG. 5 is a plan view of the conventional flower pot.
Figure 6:
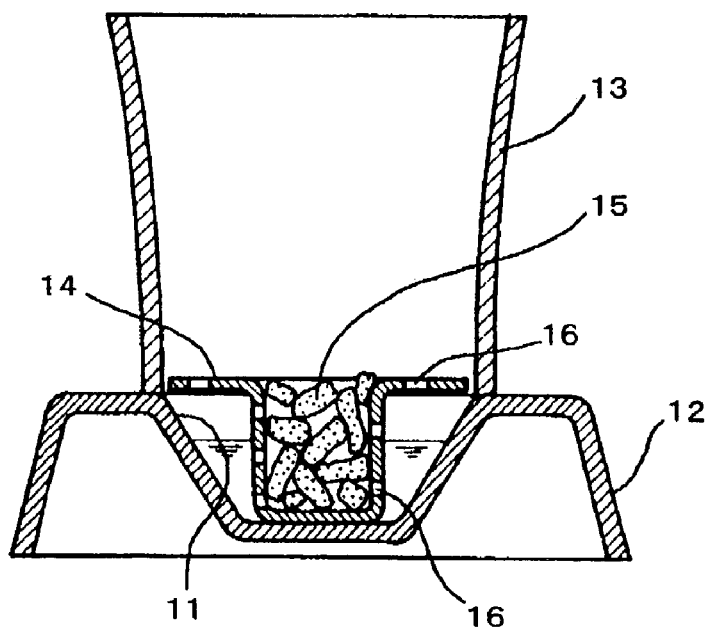
FIG. 6 is a cross-sectional view of the flower pot cut along a C—C plane in FIG. 5.
Figure 7:
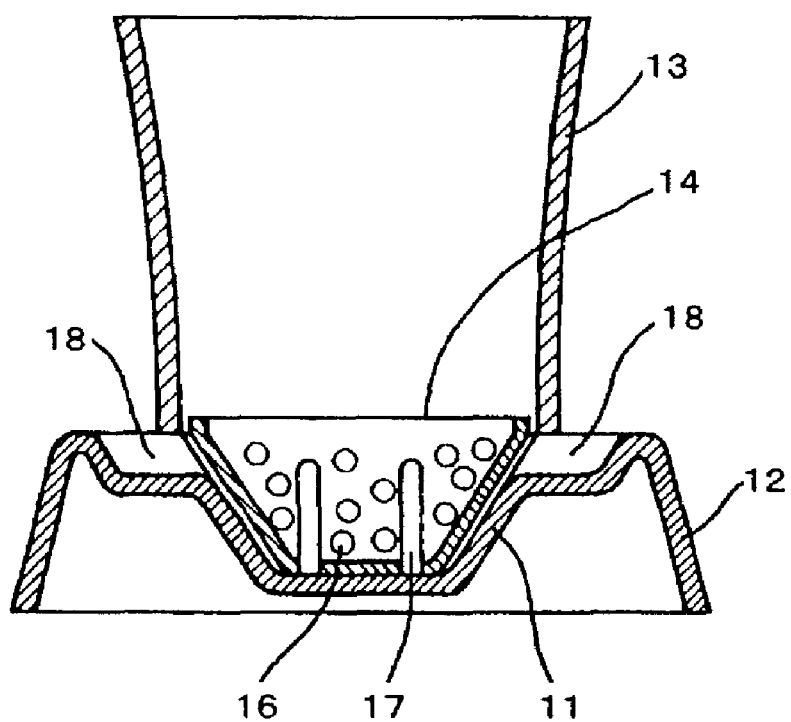
FIG. 7 is a cross-sectional view of the flower pot cut along a D—D plane in FIG. 5.

A reference numeral "1" in FIGS. 1 to 4 is a dish where a water reservoir 2 is formed in its center. The water reservoir 2 shows a circular shape in its plan view. A reference numeral "3" is a cylindrical pot uprightly standing on the dish 1.

The pot 3 is attached to the water reservoir 2 via its bottom portion. Openings (air passages) 4, 4, which extend from the water reservoir 2 to the outside, are formed between a shoulder of the dish 1 and the pot 3. Two openings 4, 4 are formed by removing the shoulder of the dish 1 partially in a diametrical direction of the dish 1 so as to form a shape like a bottom of a boat.

A reference numeral "5" is a bottom plate having a hat-shaped cross-section. A plurality of circular openings 6 are formed on the bottom plate 5 so as to enable orchid roots to extend through the circular openings 6. The bottom plate 5 is arranged such that a flange 5b is fitted in the bottom of the pot 3, when the bottom plate 5 is placed on the dish 1 as its top portion 5a being aligned downward.

In the present embodiment, the dish 1, the pot 3 and the bottom plate 5 are made of a transparent plastic. Since roots can be observed from the outside even when the dish 1 is not transparent, the dish 1 may be made of an opaque plastic.

A reference numeral "7" is a first light shade covering over the dish 1 and a reference numeral "8" is a second light shade surrounding around the pot 3. In the present embodiment, the light shades 7 and 8 have black internal surfaces and white external surfaces.

The first light shade 7 accommodates the pot 3 in its center opening and is detachably fitted to the dish 1 so as to cover over the dish 1. The second light shade 8 can be detachably fitted to the pot 3 by mating a pair of semi-cylindrical covers 8a and 8b at mating portions 9 formed on the semi-cylindrical cover 8b.

Protrusions f formed on the mating portions 9 of the semi-cylindrical cover 8b are fitted in mating holes formed on the semi-cylindrical cover 8a. The semi-cylindrical covers 8a and 8b are elastically deformed when they are mated and detached.

A reference numeral "10" is water absorbers. Pieces of broken unglazed pottery are employed as the water absorbers 10 in the present embodiment.

When an orchid is planted in the above-described flower pot equipped with light shades, orchid roots are wrapped with sphagnum and placed in the pot 3, to which water is supplied. The water absorbers 10 are placed in the top portion 5a of the bottom plate 5 and water is supplied to the water reservoir 2.

Thus, the sphagnum holds a proper amount of water that does not cause the root rot, so that excessive water drips into the water reservoir 2 via circular openings 6 of the bottom plate 5. When water is decreased due to absorption by the orchid and evaporation, water in the reservoir 2 is supplied to the sphagnum via the water absorbers 10.

Oxygen required by the roots is supplied from air, which flows through the openings 4 into the pot 3 via the circular openings 6 of the bottom plate 5.

The roots extend to the water reservoir 2 via the circular openings 6 of the bottom plate 5 and absorb oxygen directly from the atmosphere so that they grow and increase.

If necessary, growing and increasing procedures of the orchid roots can be observed when the light shades 7 and 8 are removed.

After the orchid roots are observed, the light shades 7 and 8 are fitted again so as to enhance growth of the roots.

Since the present invention is constituted in the above-explained way, the following effects are attained simultaneously.

(1) Enough oxygen and water are supplied to roots of a plant.

(2) Growth and increase of the roots of the plant are enhanced.

(3) Growth of the plant is controlled as the roots of the plant being observed from the outside.

What is claimed is:

1. A transparent flower pot comprising:
    a dish having a water reservoir in its center;
    a cylindrical pot, the bottom of which is fitted uprightly to the periphery of said water reservoir;
    a bottom plate for said pot having a hat-shaped cross-section, comprising a top portion and a flange on which a plurality of openings are formed, wherein said bottom plate is arranged such that said top portion is fitted in said water reservoir and said flange is fitted to the bottom of said pot and is arranged over said dish;
    water absorbers accommodated in said top portion of said bottom plate; and
    openings formed between said pot and said dish so as to form air passages from said water reservoir to the outside of said transparent flower pot, wherein:
    at least said pot and said bottom plate are made of a transparent plastic, and
    a detachable light shades for covering exterior surface of at least one of said dish and said pot fitted to said one of said dish and said pot;
    said light shade comprising two semi-cylindrical pieces with mating holes and protrusions.

2. The transparent flower pot according to claim 1, wherein: said water absorbers comprise pieces of broken unglazed pottery.

3. The transparent flower pot according to claim 1, wherein: said detachable light shade covers both pot and said dish.

4. The transparent flower pot according to claim 1, including a plurality of said detachable light shade covers fitted to said pot and dish for covering said pot and said dish.

5. The transparent flower pot according to claim 1, wherein the light shade has a white external surface and a black internal surface.

6. A transparent flower pot comprising:
    a dish having a water reservoir in its center;
    a cylindrical pot, the bottom of which is fitted uprightly to the periphery of said water reservoir;
    a bottom plate for said pot having a hat-shaped cross-section, comprising a top portion and a flange on which a plurality of openings are formed, wherein said bottom plate is arranged such that said top portion is fitted in said water reservoir and said flange is fitted to the bottom of said pot and is arranged over said dish;
    water absorbers accommodated in said top portion of said bottom plate; and
    openings formed between said pot and said dish so as to form air passages from said water reservoir to the outside of said transparent flower pot, wherein:
    at least said pot and said bottom plate are made of a transparent plastic, and
    at least one light shade for attachment over at least a portion of exterior surfaces of said transparent flower pot for controlling root growth by controlling the amount of light penetrating the portion of said exterior surfaces, said light shade comprising two semi-cylindrical pieces with mating holes and protrusions.

7. The flower pot of claim 6 wherein the light shade has a black interior surface.

8. The flower pot of claim 6 wherein the light shade has a white exterior surface.

* * * * *

UNITED STATES PATENT AND TRADEMARK OFFICE
CERTIFICATE OF CORRECTION

PATENT NO.    : 6,964,128 B2
DATED         : November 15, 2005
INVENTOR(S)   : Kouji Yasuda It is certified that error appears in the above-identified patent and that said Letters Patent is hereby corrected as shown below:

Title page,
Item [56], References Cited, OTHER PUBLICATIONS,
"Japanese" reference, change "1965" to -- 1995 --.

Column 4,
Line 19, change "shades" to -- shade -- and insert -- the -- before "exterior".
Line 29, insert -- said -- before "pot".

Signed and Sealed this

Thirty-first Day of January, 2006

JON W. DUDAS
*Director of the United States Patent and Trademark Office*